(12) United States Patent
Lim

(10) Patent No.: US 6,728,884 B1
(45) Date of Patent: Apr. 27, 2004

(54) INTEGRATING HETEROGENEOUS AUTHENTICATION AND AUTHORIZATION MECHANISMS INTO AN APPLICATION ACCESS CONTROL SYSTEM

(75) Inventor: Mario Lim, South San Francisco, CA (US)

(73) Assignee: Entrust, Inc., Plano, TX (US)

( * ) Notice: Subject to any disclaimer, the term of this patent is extended or adjusted under 35 U.S.C. 154(b) by 0 days.

(21) Appl. No.: 09/410,509

(22) Filed: Oct. 1, 1999

(51) Int. Cl.[7] .............................. H04L 9/32; H04L 12/22
(52) U.S. Cl. ..................... 713/201; 709/219; 709/225; 709/229; 713/155
(58) Field of Search .................... 713/182; 709/225, 709/229, 219

(56) References Cited

U.S. PATENT DOCUMENTS 6,182,142 B1 * 1/2001 Win et al. .................. 709/229
6,412,070 B1 * 6/2002 Van Dyke et al. .......... 713/200

* cited by examiner

*Primary Examiner*—Gilberto Barron
*Assistant Examiner*—Courtney D. Fields
(74) *Attorney, Agent, or Firm*—Marcel K. Bingham; Hickman Palermo Truong & Becker LLP

(57) ABSTRACT

A method and apparatus are provided for selectively authenticating and authorizing a client seeking access to one or more protected computer systems over a network. A request of a client to access one of the computer systems is received. A proxy security server is requested to authenticate the client using information identifying the client. An authorization of the client from the proxy security server is received, based on authentication results received from a remote security server that is coupled to the proxy security server. In response, access rights of the client are established, based on one or more access information records received from remote security server through the proxy security server. As a result, one or more legacy security servers may be easily integrated into an application access system without complicated modifications to the application access system.

29 Claims, 8 Drawing Sheets

INTEGRATING HETEROGENEOUS AUTHENTICATION AND AUTHORIZATION MECHANISMS INTO AN APPLICATION ACCESS CONTROL SYSTEM

FIELD OF THE INVENTION

The present invention relates to security systems in computer systems, and in particular, integration of heterogeneous security systems into an application access control system.

BACKGROUND OF THE INVENTION

Computer networks have become ubiquitous in business, industry, and education. These networks typically have one or more resources, such as applications, that provide various computing functions. Development of the globally accessible, packet-switched network known as the Internet has enabled network resources to become available worldwide. Hypertext protocols that implement the World Wide Web have evolved, ("The Web"), enabling networks to serve as a platform for global electronic commerce and the easy exchange of information between businesses and their customers, suppliers and partners.

Businesses are rushing to make their applications available over networks, including the Web, and just as quickly stumbling into several roadblocks. For example, some information is valuable and sensitive, and needs to be made available only to selected users. Thus, there is a need to provide selective access to network resources and information over the Web.

This need exists in the context of internal Web networks that are available to employees of an organization, called Intranets, as well as Web networks and resources that are available to external customers, suppliers and partners of the organization, called extranets. Extranet users may require access to a large number of applications, for example, product catalogs, customer databases, or inventory systems. There may be millions of potential users, the number of which grows dramatically as an organization grows.

One approach to some of the foregoing problems and needs is the application approach. Under the application approach, a security mechanism is provided for each application program. Often, the security mechanism provided for an application is the application's own native security system. When a user connects to an application through a network, the security mechanism for the application is invoked. For example, when connecting to an accounting application, the accounting application invokes its security mechanism. The security mechanism obtains a user id and password from the user, and then authenticates the user. Authentication refers to the process of using information to identify a user ("authentication input") and verifying that the user is what the information purports the user to be. Examples of authentication input include user id and password received from a user, or a digital certificate.

An advantage of the application approach is that it may use security mechanisms that already exist. Use of existing security systems avoids reprogramming applications to use another security system and reconfiguring the other security system, by, for example, re-entering the user id and passwords of existing users.

A disadvantage of the application approach is that it results in a heterogeneous set of security mechanisms, each of which may present the user with a different authentication procedure. Even if two security systems use the same authentication procedure, such as user id/password authentication, a user may use one user id and password pair on one system, and another user id and password pair on another system. Obviously, tracking different user ids and passwords can be very burdensome to a user.

Another disadvantage of the foregoing approach is duplication of management processes. To provide user access to a set of applications, an administrator must repeatedly add the user to each security system in use. The redundancy of these processes, combined with rapid growth in the number of users, can make the cost of deploying, managing and supporting a system unacceptably high.

Another disadvantage stems from the use of a common user interface for accessing applications over a network. The user interface is configured to interact with each security mechanism that may be accessed through the common user interface. Thus, adding a new security mechanism for a new or existing application may require reprogramming, recompilation, and reinstallation of the common user interface.

For example, new security mechanisms such as retinal scanners are becoming available. However, integrating such mechanisms is difficult. The required effort may increase costs and delays to implement new applications and security mechanisms to undesirably high levels.

Based on the foregoing, it is clearly desirable to provide a mechanism to govern access to one or more information resources in which selective access is given to particular users, a mechanism that is equally adaptable to an internal network environment and to an external network environment and which takes advantage of existing security mechanisms, and a mechanism that is easy to re-configure as new user applications and authentication techniques become available.

SUMMARY OF THE INVENTION

The foregoing needs and objects, and other needs and objects that will become apparent from the following description, are achieved by the present invention, which comprises, in one aspect, an access control system. The access control system includes a server which provides authentication and authorization services. The server uses the authentication and authorization services from a set of remote servers, which may be servers that provide the authentication services from legacy access control systems, or specialized access control systems such as authentication services based on retinal scans.

The services of the remote servers may be accessed through proxy servers. The proxy server serves as an interface between the server and the other remote servers, and provides an API through which the services of the remote servers may be accessed. The proxy servers may be instantiations of a subclass of a base class. The base class defines methods for the API. Due to the power and simplicity of the inheritance feature of object oriented technology, developers may develop subclasses which inherit the methods of the base class. A software developer need only implement methods needed to interface with a particular remote server.

A remote server may provide authentication services, authorization services, and the ability to edit information stored on the remote servers regarding users. The authorizations received by a server from the remote server may be translated into a form of authorizations used by the server. The translated authorizations may be migrated to the server, and stored in persistent storage for later use by the server.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for integrating heterogeneous authentication and authorization mechanisms into an application access control system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

Figure 1:
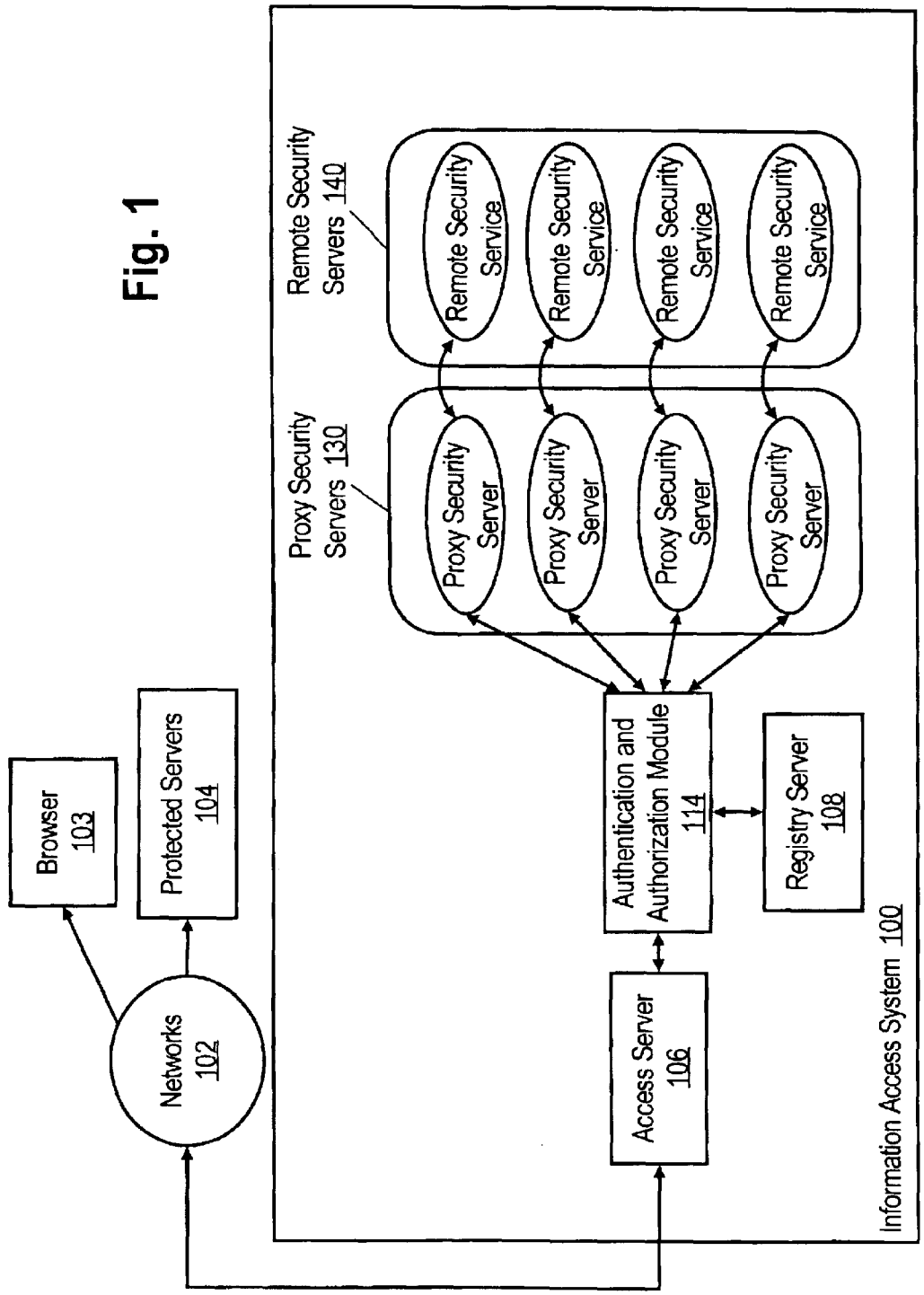
FIG. 1 is a block diagram depicting an access control system coupled to a system protected by the access control system.

FIG. 1 is a block diagram depicting elements of an information access system 100 according to a preferred embodiment. Generally, an Information Access System 100 comprises a plurality of components including an Access Server 106, Registry Server 108, and Proxy Security Servers 130, and Remote Security Servers 140. The foregoing components cooperate to control access to resources stored on one or more Protected Servers 104. Each component comprises one or more modules. There may be any number of Protected Servers 104. Users are individuals who have a relationship with an organization and play various roles, and are registered in the system 100. Users may be members of an organization, or may be customers, suppliers, or business partners of the organization. Administrators control the system. A server is a executable module that resides on at least one computer and which provides services to clients requesting those services.

In one embodiment, Protected Servers 104, Access Server 106, and Registry Server 108 are configured as disclosed in co-pending application Ser. No. 09/113,609 filed Jul. 10, 1998, the entire disclosure of which is hereby incorporated by reference as if fully set forth herein.

A browser 103 is coupled by a communication link to a network 102. The block shown for browser 103 represents a terminal, workstation computer, or an equivalent that executes a standard Web browser program or an equivalent, such as Netscape Communicator or Internet Explorer. Network 102 is a compatible information communication network, such as the Internet. In alternate embodiments, the browser 103 is a client process or client workstation of any convenient type, and the network 102 is a data communication network that can transfer information between the client and a server that is also coupled to the network.

Authentication and Authorization Module 114 manages authentication and authorization services in Information Access System 100. To provide authentication and authorization services, Authentication and Authorization Module 114 uses data stored in a central repository and managed by Authentication and Authorization Module 114 or uses authentication and authorization services provided by Remote Security Servers 140. The authentication and authorization services provided by Remote Security Server 140 may be accessed through a Proxy Security Server 130. A Proxy Security Server 130 serves as an interface between Authentication and Authorization Module 114 and a Remote Security Server 140.

Proxy Security Servers 130 provide an application programmer interface ("API"). An API is a symbolic interface that defines inputs and outputs to a set of computer program routines through which services provided by a server may be accessed by clients of the server. The API provided by Proxy Security Servers 130 allows Authentication and Authorization Module 114 to access services provided by Remote Security Servers 140. To assist Remote Security Servers 140 in servicing the requests of Information Access System 100, Authentication and Authorization Module 114 also provides a set of services for Remote Security Servers 140. These services are also accessed through the API.

Each of Remote Security Servers 140 manages authentication profiles about users and may manage information about access rights of one or more applications residing on Protected Servers 104. Access rights refer generally to actions that may be performed on behalf of a given user, including, for example, access to read or write data from a Resource. A Remote Security Server 140 may be, for example, a legacy security service used by an accounting application that resides on a Protected Server 104, which may be running under the Windows NT™ operating system. The legacy security service is the security service provided by Windows NT. Authentication and Authorization Module 114 may access the security service of Windows NT through a Proxy Security Server 130. This ability enables Information Access System 100 to manage access to the accounting application through information and services that already exist on other security systems, preserving time, effort, and money already invested in those systems.

Access Roles

The Information Access System 100 enables administrators to implement access rules by defining roles (Access Roles) that users perform when working for an organization or conducting business with an enterprise. An Access Role may reflect a relationship of a user to the organization (employee, customer, distributor, supplier), their department within an organization (sales, marketing, engineering) or any other affiliation or function (member of quality task force, hotline staff member) that defines their information needs, and thus their access rights or privileges. Examples of Roles include Employee, Customer, Distributor, Supplier, Sales, Marketing, Engineering, and Hotline Staff.

Access Roles are defined by information identifying a name of a role and by a functional group in which the role resides. A functional group is often a department in which similar functions exist. Examples of functional groups are Marketing, Sales, Engineering, Human Resources, and Operations. Access Roles are also associated with a User Type.

Access Roles determine what resources a User can access. Further, each Access Role may allow access to a subset of information that is available in resources. For example, a User who is an Employee in the Marketing department could access Price List and New Products Resources. Thus, Information Access System 100 enables the creation of resource profiles by assigning roles to resources, and by assigning roles to users to generate access rights. Information Access System 100 automatically links a user to the resources profiles that have been assigned the same roles, so that deployment of new resources may occur rapidly.

Information Access System 100 may manage such roles using the methods and mechanisms disclosed in co-pending application Ser. No. 09/248,764, filed Feb. 12, 1999, the entire disclosure of which is hereby incorporated by reference as if fully set forth herein.

User Login

The Information Access System 100 also enables Users to log-in to the system once, and thereafter access one or more resources on a network during an authenticated session. Users may, for example, log in either with a digital certificate or by opening a login page URL with a web browser and entering a name and password. In the past, users have had to log in individually to each application that they are authorized to use. In the preferred embodiment, users always access the same login page regardless of the number of resources to which they need access. Thus, the system provides a mechanism of single secure log-in to resources available on a network.

When a user attempts log in, Information Access System 100 establishes a session. Specifically, a unique session number is generated, and port and connection information ("session information") is stored in association with the session number. The combination of a session number and session information is referred to as a session. Session information includes information that identifies a user, and that indicates whether the user has been authenticated. A session associated with a user that has been authenticated is referred to as an authenticated session until the authenticated session expires. An authenticated session may, for example, expire after the elapse of threshold period of time. Until the authenticated session expires, the user associated with the authenticated session may access one or more resources protected by the Information Access System 100.

If the Login attempt is successful, that is, the user has been authenticated and is authorized to access resources protected by Information Access System 100, the Information Access System 100 presents the user with a personalized menu. The personalized menu assists the User in identifying and selecting a resource to access. In one embodiment, a personalized menu is an HTML page containing a list of authorized resources. The personalized menu displays only resources to which the User has access. The user can then select and access a Resource.

Session information may be structured and managed using the methods and mechanisms disclosed in co-pending application Ser. No. 09/363,315, filed Jul. 28, 1999, the entire disclosure of which is hereby incorporated by reference as if fully set forth herein.

Integrating Authentication Mechanisms

Figure 2:
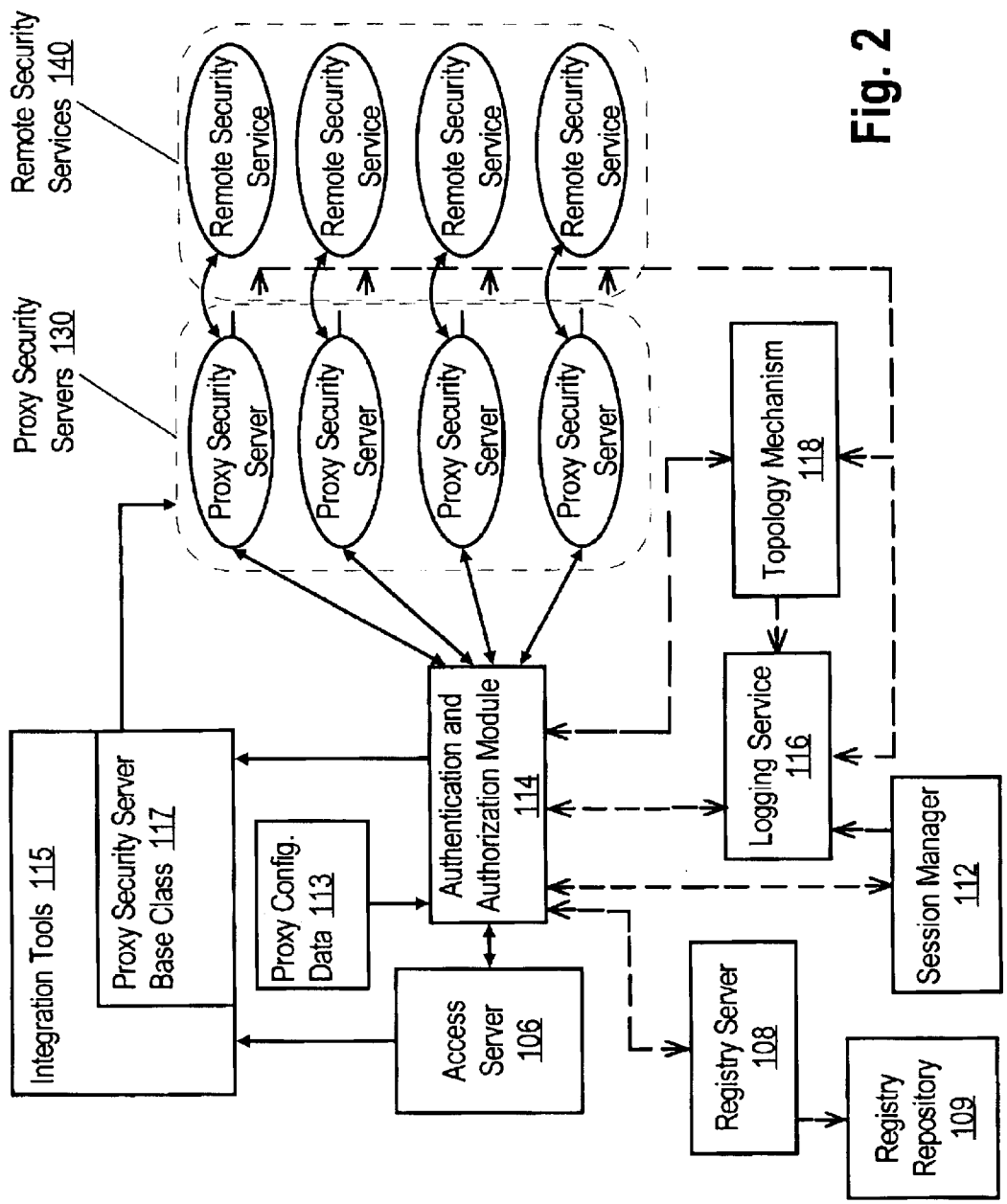
FIG. 2 is a block diagram depicting an access control system in greater detail than FIG. 1.

FIG. 2 shows Information Access System 100 in greater detail. Access Server 106 stores a log-in page, and is coupled to the Authentication and Authorization Module 114. The Access Server 106 may receive authentication input regarding a particular user for a particular session and transmit it to the Authentication and Authorization Module 114, which uses the information to authenticate a user. The Authentication and Authorization Module 114 returns information that specifies whether the user is authenticated, and the access roles for the user.

The Authentication and Authorization Module 114 authenticates the user in one or more ways. The Authentication and Authorization Module 114 may authenticate a user by verifying the password with the Registry Server 108. Alternatively, the Authentication and Authorization Module 114 may use authentication services of one of the Remote Security Services 140 to authenticate the user.

The Registry Server 108 manages a registry repository 109, which may be structured as a database. The registry repository contains information about how to authenticate users and what authorizations a user has, including a mapping of a particular user to access roles. Information about how to authenticate a particular user is referred to as an authentication profile, and may include data indicating a user id, password, and which Proxy Security Servers 130 to use to authenticate a user. An authorization is a privilege to perform a particular action with respect to a set of resources on a computer system. For example, an authorization may define access to a particular Web page or a set of directories.

For each user it authenticates, the Authentication and Authorization Module 114 generates data representing the authorizations of the user in the form of access roles. The Authentication and Authorization Module 114 generates the access roles using authorization information recorded by Registry Server 108, or authorization information obtained from Remote Security Service 140 through a Proxy Security Server 130. It then encrypts data representing the access roles and sends the encrypted data in a cookie to the user's browser. A "cookie" is a packet of data sent to web browsers. Each cookie is saved by browser 103 until the cookie expires. A returned cookie is required for access to resources protected by Information Access System 100.

A Session Manager 112 manages sessions throughout Information Access System 100. Session Manager 112 establishes new sessions upon request by various components of Information Access System 100, including, for example, Access Server 106 when Access Server 106 is logging in a user. Session Manager 112 also expires sessions according to various criteria and techniques.

Logging Service 116 receives information about the actions taken by various modules of Information Access System 100 and records actions as events in one or more logs. For example, when Session Manager 112 expires an authenticated session, Session Manager 112 transmits a message to record the expiration of the authenticated session.

The Topology Mechanism 118 tracks various components of Information Access System 100 when the components starts up. In particular, Topology Mechanism 118 receives messages from a particular component when it starts up, and, in response, may transmit messages to other components to inform them that the particular component has started.

Integration Tools 115 are selectively executed on Information Access System 100 and function to customize the particular configuration of the foregoing components. For example, Integration Tools 115 are used to customize the form or content of screen displays presented by browser 103 for user login and logout, or to enforce password selection rules, or to program and develop Proxy Security Servers 130. Integration Tools 115 include Proxy Security Server Base Class 117, which are later described.

Proxy Configuration Data 113 is data that specifies the configuration of each of Proxy Security Servers 130. Proxy Configuration Data 113 specifies, for example, whether a particular Proxy Security Server 130 provides authorization services. Proxy Configuration Data 113 shall later be described in greater detail.

In one embodiment, Information Access System 100 is stored on and executed by one physical server or computer. In alternate embodiments, one or more components are installed on separate computers.

Starting Up the Authentication and Authorization Module and Proxy Security Servers In an embodiment, the Session Manager 112, Logging Service 116, and Topology Mechanism 118 start up before Authentication and Authorization Module 114 and any of Proxy Security Servers 130. Relative to each other, a Proxy Security Server 130 and the Authentication and Authorization Module 114 may start-up in any order.

When the Authentication and Authorization Module 114 starts up, it reads Proxy Configuration Data 113 and stores data representing the Proxy Configuration Data 113 in memory. Authentication and Authorization Module 114 then checks-in with the Topology Mechanism 118. If any of Proxy Security Servers 130 have previously started up and checked-in with Topology Mechanism 118, then Topology Mechanism 118 transmits a message to Authentication and Authorization Module 114 indicating the availability of the already running Proxy Security Servers 130.

When a Proxy Security Server 130 starts up, it checks-in with Topology Mechanism 118. If Authentication and Authorization Module 114 is already running, then Topology Mechanism 118 transmits a message indicating the availability of the Proxy Security Server 130 that has just checked in.

Proxy Security Service Framework

A Proxy Security Server 130 allows Authentication and Authorization Module 114 to access any Remote Security Servers 140 through a common API. The API enables Authentication and Authorization Module 114 to interface with any Remote Security Servers 140 in a common manner. The Authentication and Authorization Module 114 and Proxy Security Servers 130 may be compliant with Common Object Request Broker Architecture (CORBA) communicating to each other using the framework defined by CORBA. Proxy Security Servers 130 may be Java objects that are instantiations of Java classes.

Proxy Security Server Base Class 117 is an abstract class from which Proxy Security Server Subclasses inherit methods and data. A Proxy Security Server Subclass, represented in FIG. 2 by Proxy Security Servers 130, is a class from which a Proxy Security Server 130 may be instantiated. The Proxy Security Server Base Class 117 defines methods of the API. Some of the methods are implemented in the base class. Other methods are implemented in a subclass of the base class.

A Proxy Security Server 130 may implemented as multi-threaded CORBA server that interacts with the Authentication and Authorization Module 114 and a Remote Security Servers 140. The Proxy Security Servers Base Class 117 supplies the implementations to support CORBA, multi-threading, and other aspects of a Proxy Security Server 130. Due to the power and simplicity of inheritance in object oriented development environment, a developer of a particular Proxy Security Server subclass does not have to address CORBA or the multi-threaded aspects of a Proxy Security Server subclass. A developer need only extend from the Proxy Security Server Base Class 117 to implement a limited set of methods needed for a particular Remote Security Server 140.

Services Provided by Proxy Security Servers Through the Common API

Figure 3A:
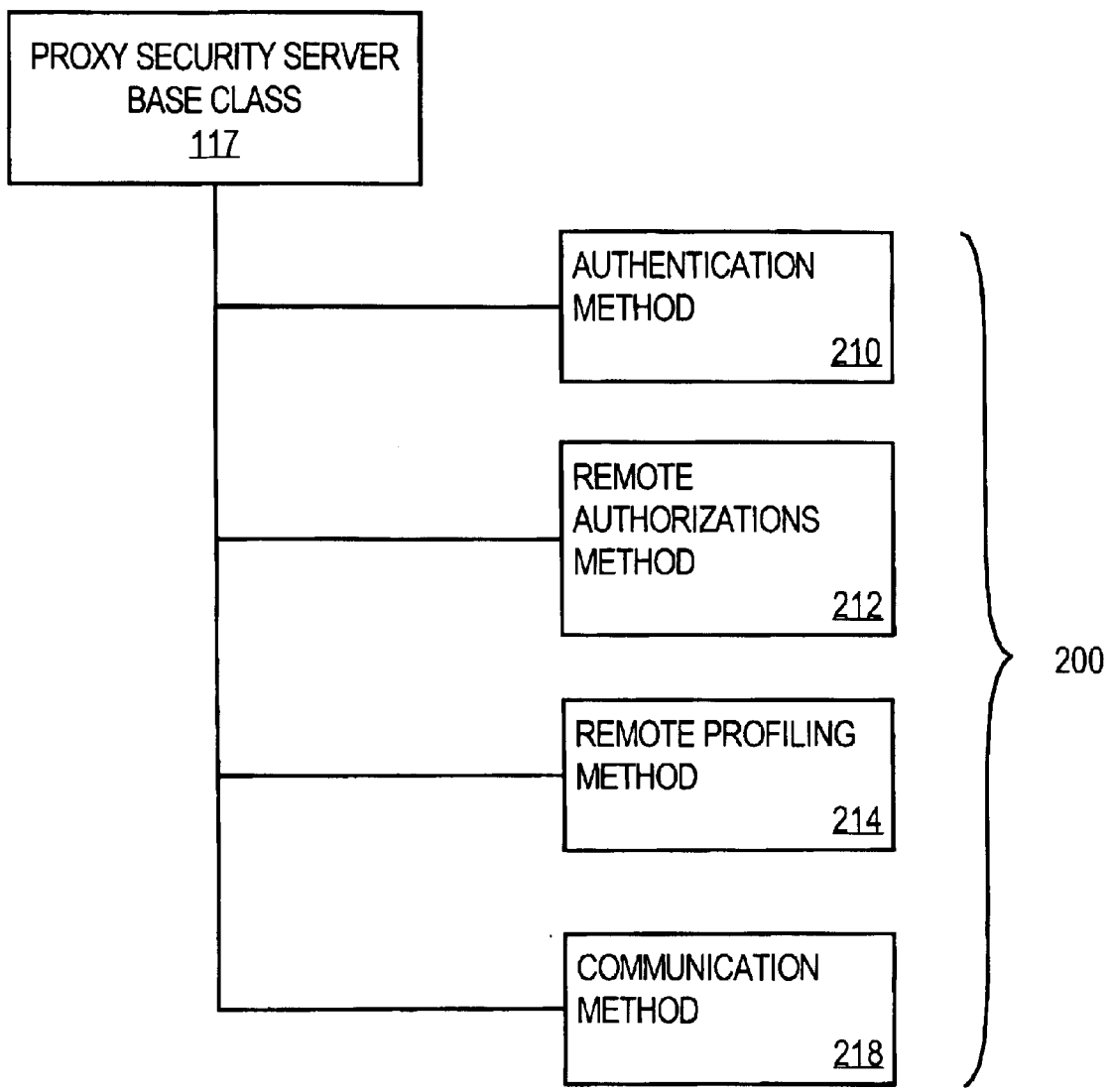
FIG. 3A is a block diagram of method that may be used to implement an integration of security systems in an application access system.

A Proxy Security Server 130 makes available services provided by Remote Security Servers 140 to Information Access System 100. These services are accessed by invoking a method of the API, and in particular, may be accessed by invoking methods of Proxy Security Servers 130. The methods may be implemented in the Proxy Security Server Subclasses 200, as shown in FIG. 3A, although for some of these methods a default behavior is implemented in the base class. A description of the methods that may be implemented, and the functionality they provide as services, follows. Additional details about these methods and their functionality, and about additional methods and functionality, may be found in Appendix I.

AUTHENTICATION: A Proxy Security Server Base Class 117 defines at least one method that may be invoked to authenticate a user. The authentication method 202 is implemented in a Proxy Security Server Subclass. See, for example, pam__sm__authenticate in Appendix I. Generally, the implementation for this method is specific to a particular Remote Security Server 140. Authentication and Authorization Module 114 passes a session identifier and authentication input, such as a user id and password, digital signature, or biometric data, for example, a thumbprint image. The method is executed to authenticate the user associated with the session, in accordance with its then-current implementation. The architecture and configuration of elements disclosed herein, in combination with the power and versatility of object oriented languages that may be exploited to develop subclasses results in a set of Proxy Security Servers 130 that interface to a wide range of Remote Security Servers 140.

REMOTE AUTHORIZATION: Proxy Security Server Base Class 117 may define at least one method that allows Authentication and Authorization Module 114 to modify authorizations on a Remote Security Server 140. The remote authorization method 204 is implemented in a Proxy Security Server Subclass. See, for example, pam__chauthtok (String pamh), in Appendix I. The ability to modify authorizations on a Remote Security Server 140 is referred to as remote authorizations. A developer provides the implementation for the method. When Authentication and Authorization Module 114 invokes the method, it passes in a session identifier.

REMOTE PROFILING: Proxy Security Server Base Class 117 defines at least one method that provides the ability to modify a user profile on a Remote Security Server 140. A user profile is data describing demographic information about a user, for example, the user's address, full name, and marital status. The method remote profiling 206 is implemented in a Proxy Security Server Subclass. See, for example, pam__chauthtok, in Appendix I. This ability to alter a user profile on a Remote Security Server 140 is referred to as remote profiling. A developer provides the implementation for the method. When Authentication and Authorization Module 114 invokes the method, it passes in the session identifier.

COMMUNICATING AVAILABLE FUNCTIONALITY: Not all Proxy Security Servers 130 provide the same set of services. For example, a Proxy Security Server 130 may provide authentication and remote profiling, but not remote authorization. When a Proxy Security Server 130 starts up, Authentication and Authorization Module 114 needs to know what services a particular Proxy Security Server 130 provides. For this purpose, a Proxy Security Server Base Class 117 provides at least one communication method. The communication method 208 is implemented in a Proxy Security Server Subclass. See, for example, getImplementedFunctions( ) in Appendix I.

Figure 3B:
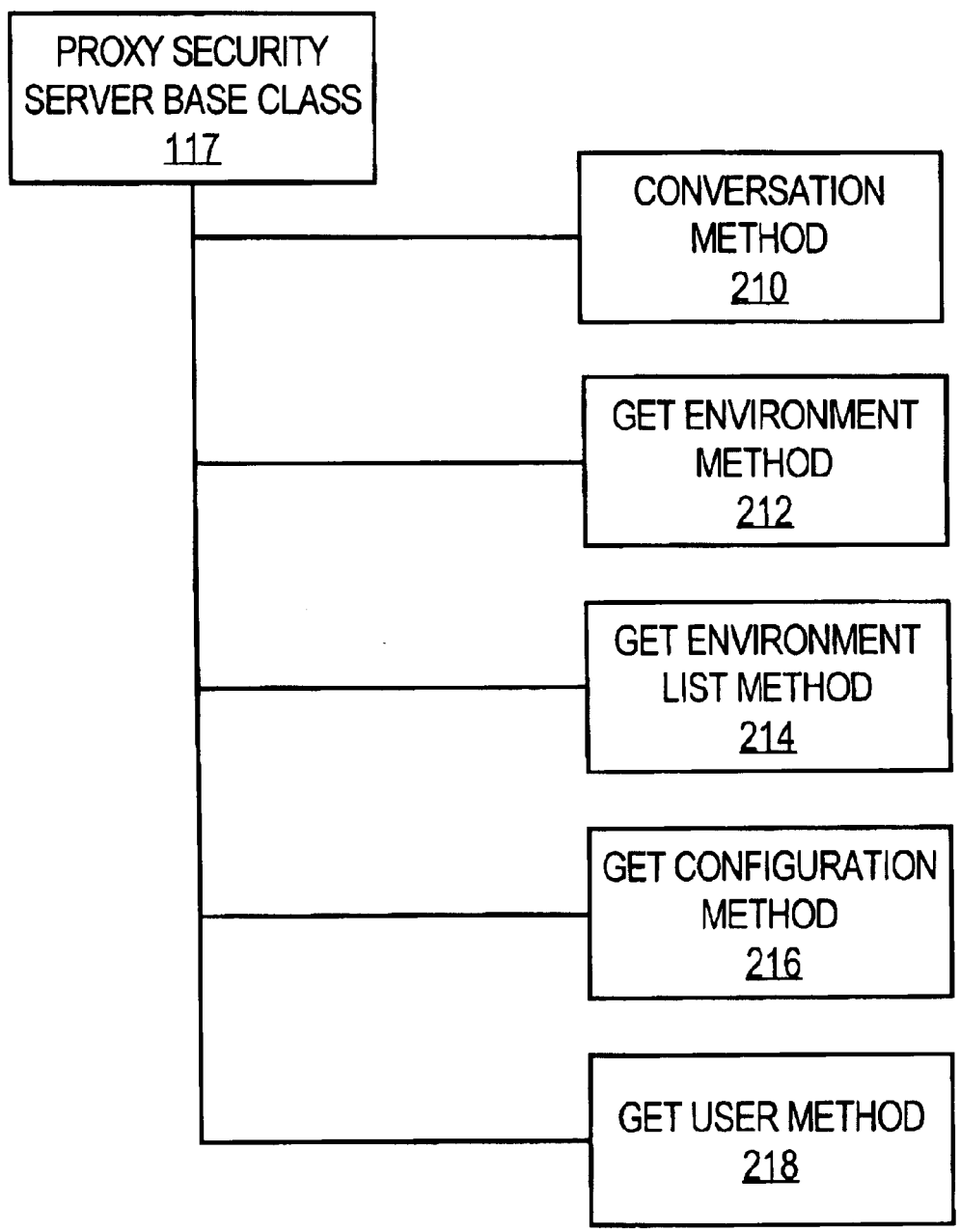
FIG. 3B is a block diagram of additional methods.

Functionality Provided by Authentication and Authorization Module to Proxy Security Servers To provide services to Authentication and Authorization Module 114, a Proxy Security Server 130 may need to obtain information through Authentication and Authorization Module 114, or request other services from Authentication and Authorization Module 114. For example, a Remote Security Server 140 may need to query a user to get data for changing a user profile. Such services are accessed by invoking a method of the API defined in Proxy Security Server Base Class 117. A description of these services follows and FIG. 3B depicts the structure of the methods. Additional details about these services and their functionality, and about additional services and methods, may be found in Appendix II.

INTERFACING WITH A HUMAN USER: Proxy Security Server Base Class 117 defines at least one method that be invoked to communicate with a human user. Such methods are referred herein to as conversation methods. See pam_conv in Appendix II. For example, to change a user profile, a method that implements remote profiling may invoke a conversation method 210 to obtain inputs from the user that are used to update the user profile. Input parameters passed to the conversation method may specify whether user input should be obtained using a text box, a label for the text box, and whether user input is echoed as it is entered, or a list of selections to be displayed in a list box presented to the human user.

ENVIRONMENT INFORMATION: Proxy Security Server Base Class 117 defines at least one method that may be invoked to obtain information about a user or the operating environment. For example, a method may be invoked to obtain the user id and password associated with a session, or the network address of the device from which the user is attempting to log in. These methods may comprise a Get Environment method 212, Get Environment List method 214, Get Configuration method 216, and Get User Method 218. See, pam_getenv, pam_getenvlist, pam_get_configuration, pam_get_user, for example, in Appendix II.

Registration and Self Registration

Registration refers to a process of receiving data that identifies a user and specifies an authentication profile for the user. A user may be registered in Information Access System 100 in a variety ways. For example, a system administrator may use an administrative user interface provided by Information Access System 100 for receiving data used to register users from a system administrator. In particular, Information Access System 100 receives input that specifies a user id, which Information Access System 100 stores in Register Server 108. In addition, Information Access System 100 receives data from a system administrator specifying an authentication profile. The authentication profile may include data specifying a Proxy Security Server Name that corresponds to a Proxy Security Server 130 used to authenticate the user.

Self-Registration refers to a process in which a user registers itself, by supplying to the Information Access System 100 data that specifies an authentication profile. For example, when a user first logs into to Information Access System 100, Access Server 106 presents a login page to the user. The login page includes a text box for the user to enter a user id and a password, and a list box listing Proxy Security Server Names as selections. The user enters the strings "John Doe" as the user id and "DoeString" as the password, and picks a selection from the list box. Information Access System 100 then transmits a message to a Proxy Security Server 130 that corresponds to the selected Proxy Security Server Name. In an embodiment, the message is transmitted by invoking the pam_auth method of the Proxy Security Server 130.

The Proxy Server 130 then transmits a message indicating that the user is authenticated to Authentication and Authorization Module 114. In response, Authentication and Authorization Module 114 registers the user id, storing in Registry Server 108 data specifying the user id and Proxy Security Server Name. The user may later add or delete Proxy Security Server Names, or other information in the user's authentication profile.

Dynamic Authorization Mapping

Once a registered user is authenticated, the authorizations for the user are determined. Typically, a user is associated with a default set of authorizations. In addition, a system administrator may have assigned access roles to a particular user. When a user logs into Information Access System 100, the Authentication and Authorization Module 114 gets from Registry Server 108 the access roles assigned to the user. In addition, the Authentication and Authorization Module 114 will get authorizations from any Proxy Security Server 130 specified in the user's authentication profile.

The authorizations obtained from Proxy Security Server 130 may not be in the form of access roles, and thus may be converted to Access Roles in a process referred to as Dynamic Authorization Mapping. In a dynamic authorization mapping, authorizations provided by Proxy Security Servers 130 are converted to Access Roles based on a mapping. The mapping is stored in Proxy Configuration Data 113, and shall be described in greater detail. The Access Roles generated by the conversion are merged with any Access Roles specified by Registry Server 108 for the user.

Migrating Authorizations from Remote Security Servers

Information Access System 100 may used to replace a legacy security system. The effort invested in configuring a legacy security system with authentication and authorization information may be preserved by implementing a Proxy Security Servers 130 for the legacy security system. However, it may be desired to eventually discontinue use of the legacy system, so the information on the legacy security system must be transferred to Information Access System 100.

One technique described herein for efficiently transferring this information is referred to Dynamic Migration. Dynamic Migration is the process of permanently assigning Access Roles generated by converting information from a Remote Security Server 140. These converted access roles are subsequently associated with the user whenever the user logs in. Dynamic Migration may be performed when a user self registers. Data in Proxy Configuration Data 113 specifies whether Dynamic Migration is performed for a Proxy Security Server 130, that is, whether Dynamic Migration is performed for a user who self registers and selects the Proxy Security Server 130.

Configuration Data

Configuration Data 113 is organized as one or more blocks of data, each of which is associated with a Proxy Security Servers 130. Each block contains entries that specify an operational aspect of a Proxy Security Server 130. Each entry contains a string specifying a parameter name, followed by a '=' character, followed by string specifying a parameter value. An example of Configuration File 15 follows.

```
[UserPasswordPam]
name=UserPasswordPam
desc=Userid/Password
usrtag=Userid
pwdtag=Password
env=
translate=false
selfreg=false
authsourcename=UserPassword
config=
    getAccessRoot:c:\enCommerce\getAccess||debug:false
[CertPam]
name=CertPam
desc=Certificate
usrtag=
pwdtag=
env=CLIENT_CERT||COOKIE:CERTCOOKIE#
translate=false
selfreg=false
authsourcename=Certificate
config=
    getAccessRoot:c:\enCommerce\getAccess||debug:false
```

A block begins with a tag, which may be a bracketed string, that specifies a Proxy Security Server Name. The example above has two blocks. The first block begins with the tag '[UserPasswordPam]'.

The first entry in the first block is the name value pair 'name=UserPassword', and it specifies a Proxy Security Server Name. 'name' is the parameter name, and 'UserPassword' is the Proxy Security Server Name.

The Proxy Security Server Name is used to associate a Proxy Security Server 130 with a block. A Proxy Security Server 130 is associated with a Proxy Security Server Name when the Proxy Security Servers 130 is started, by, for example, specifying the Proxy Security Server Name as input argument value in the command used to invoke the proxy server. A Proxy Security Server 130 associated with a Proxy Security Server Name is herein referred to as the named Proxy Security Server 130.

The parameter 'desc' specifies a description that is displayed to the user to refer to the named Proxy Security Servers 130.

Parameter 'usrtag' is the entry for the label displayed next to a text box used to receive user input specifying a user id.

Parameter 'pwdtag' is the entry for the label displayed next to a text box used to receive user input specifying a password.

Parameter 'env' is used to specify an environmental variable that is caught. The block beginning with the tag [CertPam] indicates certification parameters and shows a use of the parameter 'env'. In this case, the environment variable could be called CLIENT_CERT, or can be sent in the form of cookies.

The parameter 'selfreg" is used to specify whether a user may self register by selecting the named Proxy Security Server 130.

The parameter 'translate' specifies whether dynamic mapping is performed for the authorizations supplied by the named Proxy Security Server 130.

The 'config' entry depends on the Proxy Security Servers 130 itself. For example, a Proxy Security Servers 130 used to interface to a Remote Security Servers 140 that uses Windows NT Domain Authentication requires the number of domains to authenticate as well as the name of each of the domain.

Specifying a Mapping in the Configuration Data

To perform dynamic authorization mapping, a mapping is specified in the block associated with a Proxy Security Server 130. The example entry illustrates a mapping for a Proxy Security Server 130 that interfaces with a Remote Security Server 140 that uses Windows NT Domain Authentication.

```
[NTDomainPam]
name=NTDomainPam
desc=NT Domain Authentication
usrtag=Userid
pwdtag=
env=
translate=true
selfreg=true
authsourcename=NTDomain
config=numberOfDomains=1||domain1:Marketing
usertype=undef
Domain Users=emplye
Domain Admins=excacc.spradm
```

The example Proxy Configuration Data 113 above specifies to Authentication and Authorization Module 114 that a Proxy Security Server 130 associated with the Proxy Security Server Name NTDOMAIN can perform self-registration and dynamic authorization mapping. If the authorizations returned by the named Proxy Security Server 130 include the 'Domain Users' group, the user type will be translated to 'emplye'. Likewise, if the returned authorizations include 'Domain Admins', then the user has the administrative role referred to as 'excacc.spradm'.

Example Method of Operation

Figure 4A:
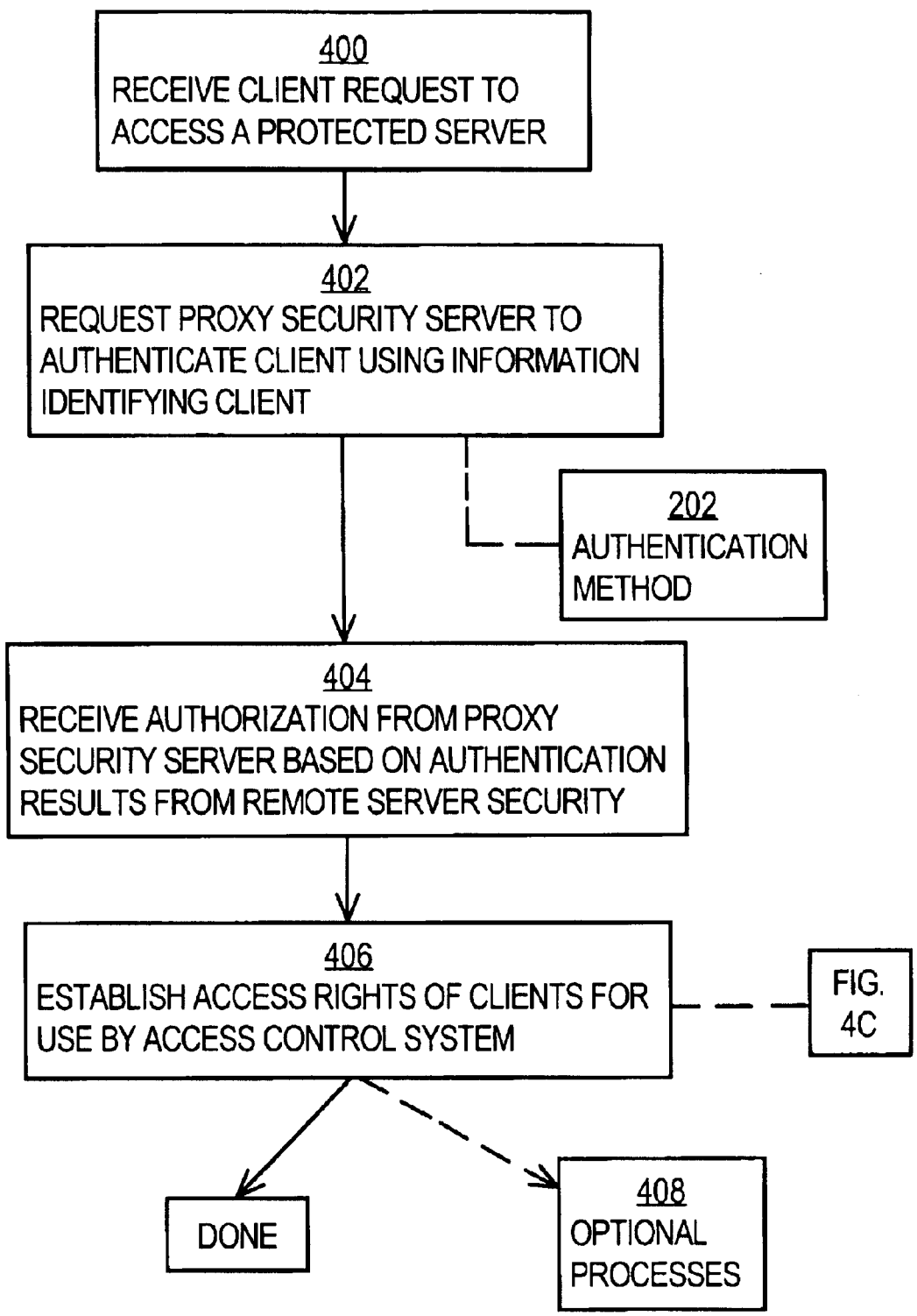
FIG. 4A is a flow diagram of a method of integrating security systems into an application access system.

FIG. 4A is a flow diagram of an exemplary method of operation of the system of FIG. 2. The method of FIG. 4A may be implemented in one or more computer programs, processes, data structures, or related elements that form Authentication and Authorization Module 114.

In block 400, a request to access a protected server is received from a client. For example, Browser 103 as shown in FIG. 1 contacts Access Server 106 and requests an electronic document of one of the Protected Servers 104. Access Server 106 forwards the request to Authentication and Authorization Module 114.

In block 402, a proxy security server is requested to authenticate the client using information that identifies the client. For example, Authentication and Authorization Module 114 uses authentication method 202 to request one of the proxy security servers 130 to authenticate the client. In the course of executing the authentication step, the proxy security server may use one of the remote security services 140 to conduct authentication.

If the authentication request is unsuccessful, then the access server returns a message to the client indicating that access is refused. These steps are omitted from FIG. 4A for clarity. If the authentication is successful, then in block 404, authorization is received from the proxy security server based on authentication results that are received from a remote security service that is associated with the proxy security server.

In block 406, access rights for use with an application access system and associated with the client are established. The process of FIG. 4C may be used.

Figure 4B:
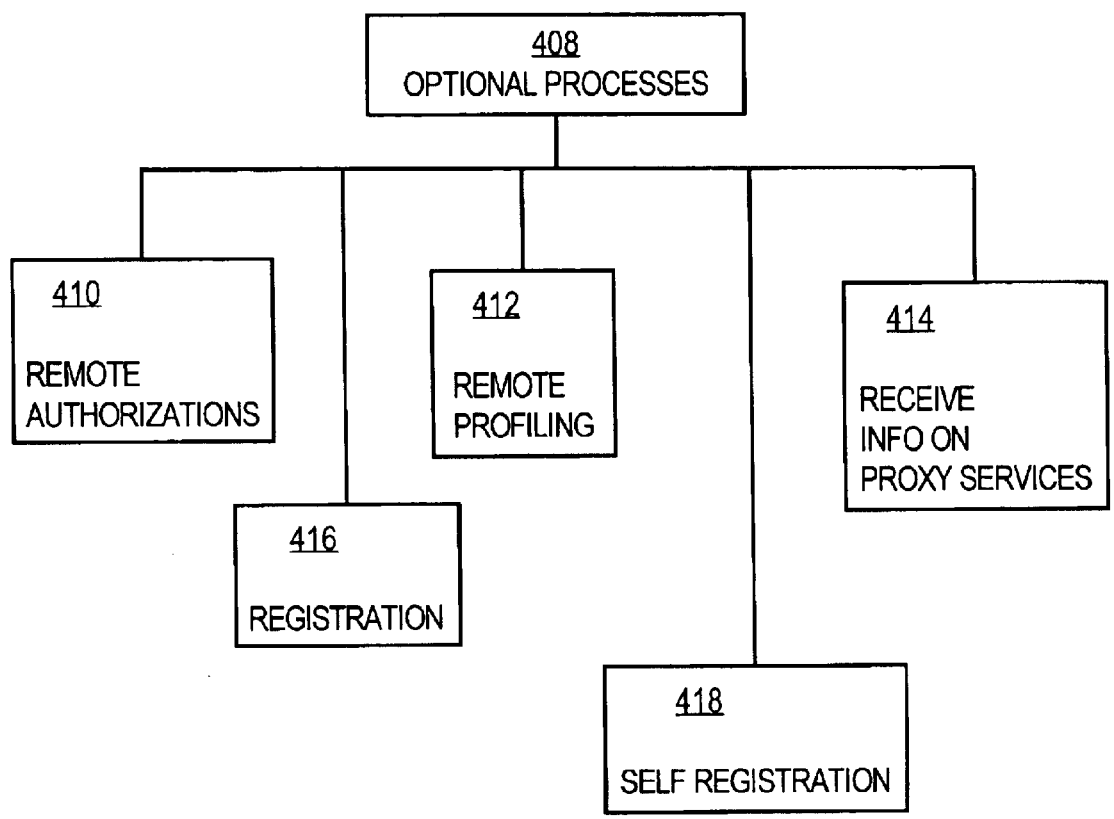
FIG. 4B is a flow diagram of optional processes in the method of FIG. 4A.

Optional processes may be carried out after block 406 or at any other appropriate time in the process, as indicated by block 408. FIG. 4B is a block diagram of optional processes 408 that may be carried out. The optional processes 408 may include one or more of remote authorizations 410, remote profiling 412, or communications such as receiving information on available proxy services, as indicated by block 414. Optional processes 408 may also include registration 416 or self registration 418. These processes may be carried out using the mechanisms described above with respect to FIG. 2, FIG. 3A, and FIG. 3B.

Figure 4C:
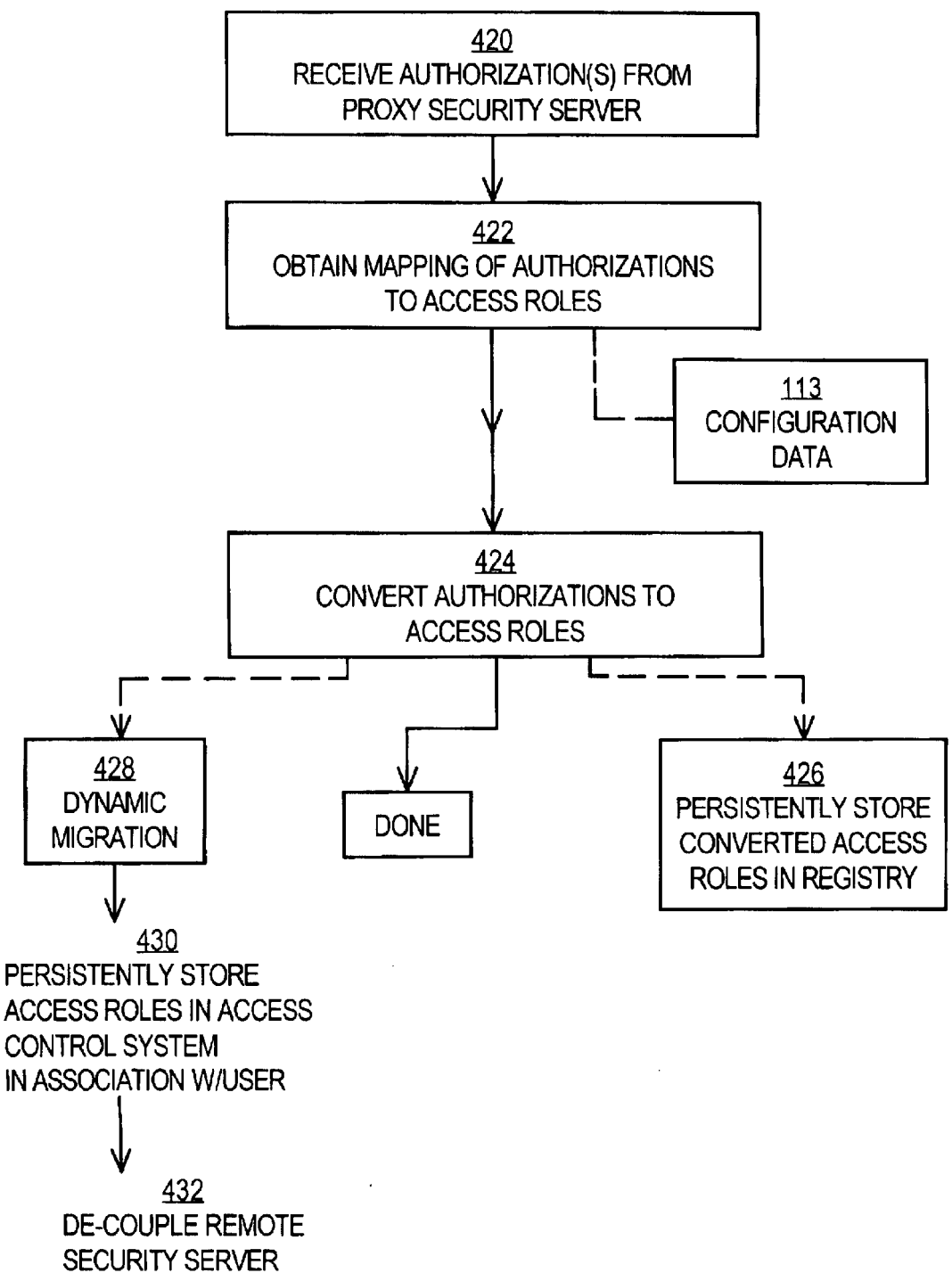
FIG. 4C is a flow diagram of further steps in the method of FIG. 4A.

FIG. 4C is a flow diagram of further steps that may be used to carry out the process of block 406.

In block 420, authorizations associated with the current client are received form the proxy security server. In block 422, a mapping of authorizations to access roles is obtained. The mapping may be stored in and obtained from Configuration Data 113.

In block 424, the authorizations are converted to access roles that can be used by an access control system such as Information Access System 100. When conversion is complete, one of three paths may be followed. One path is that the process may terminate processing, as indicated by the "DONE" block. Another path is that the process may persistently store the converted access roles in a registry, for example, using Registry Repository 108, for use later.

Still another path is that the process may carry out dynamic migration, as indicated by block 428. In dynamic migration, the access roles are persistently stored in the access control system in association with user identifying information. The remote security server may be decoupled from the system, as shown by block 432. Thereafter, the access roles are used to authenticate the user. In this way, authentication information in a legacy remote security server is automatically transferred to the access control system, and the legacy remote security server may be retired from service.

Hardware Overview

Figure 5:
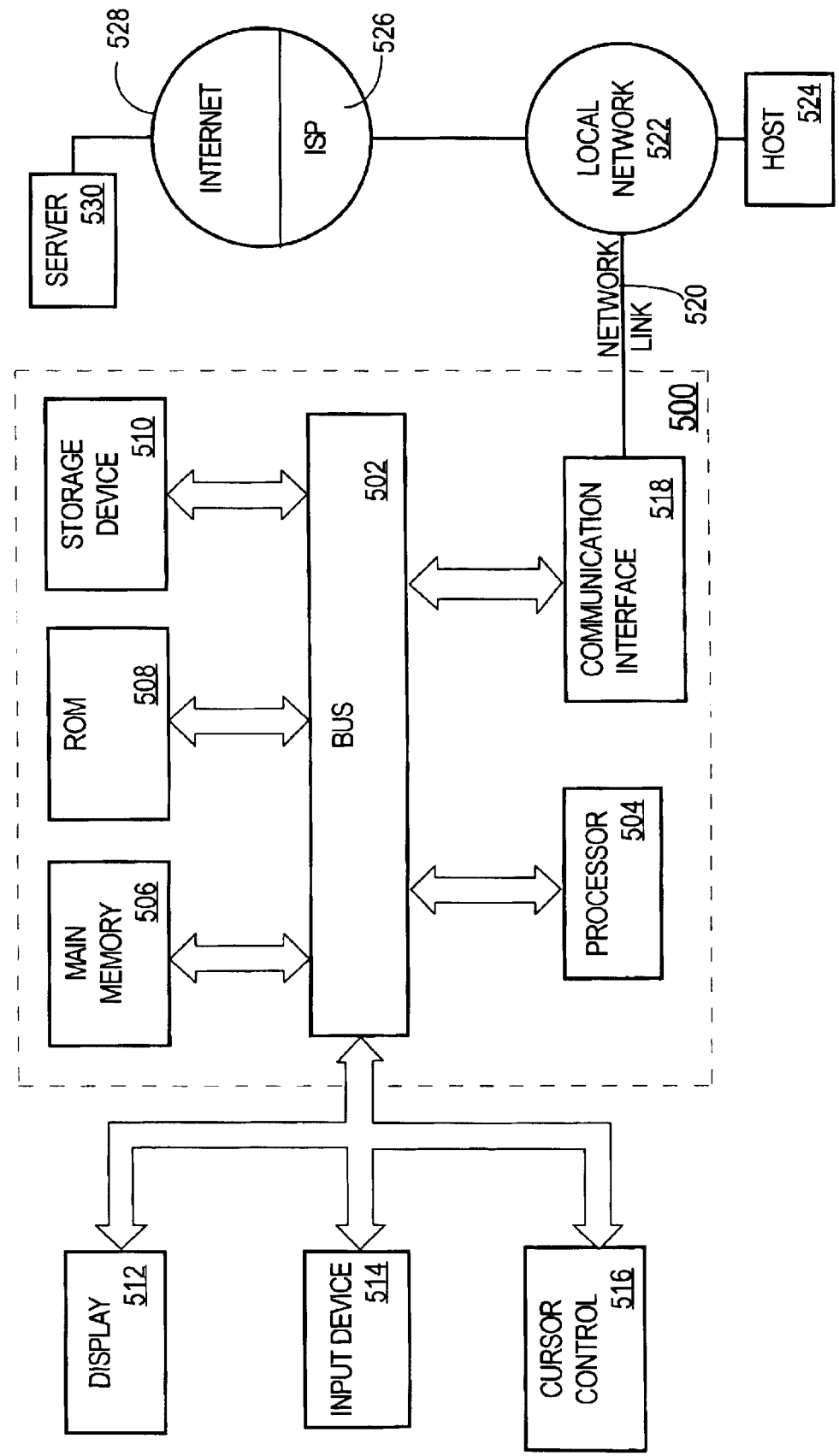
FIG. 5 is a block diagram depicting a computer system upon which an embodiment of the present invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 as an access control system. According to one embodiment of the invention, an access control system is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for an access control system as described herein.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX I

Methods Used to Access Services Provided by Proxy Security Server abstract protected int pam_sm_authenticate(String pamh, String args[ ])

Any Proxy Security Server Class should implement this method to provide authentication. This is the core of developing a Proxy Security Server Classes because authentication is the minimum action that a Proxy Security Server Classes performs. This method receives the Proxy Security Server Class handle (pamh) for the user session and a set of arguments. The Proxy Security Server Classes handle is the handle that provide extra information about the user, and the second parameter is an array of arguments that are passed to the authentication method. Currently, the second parameter is an empty array. This method should return one of the following return codes:

PAM_SUCCESS—This code is returned when the authentication process was successful.

PAM_ACCT_EXPIRED—This code is returned when the user account is inactive, but the user is authentic.

PAM_USER_UNKNOWN—This code is returned when the user is an unknown user or the userid, password combination is not valid.

PAM_NEW_AUTHTOK_REQD—This code is returned when a new password is required, this means that the current password has expired or is no longer valid for any other reason.

PAM_CRED_INSUFFICIENT—This code is returned when the credentials are not sufficient to validate the user.

PAM_AUTH_ERR—This code is returned when an unexpected error occurs.

PAM_FATAL—This code is returned if there is a fatal error in the remote security server.

abstract protected Thread getNewInstance(String pamh, PAMDataShare dataShare)

This method is called to thread out when multiple users are using a Proxy Security Server and to perform conversation back to the user.

public int getImplementedFunctions( )

This method should return the methods implemented by the Proxy Security Server Classes. By default, all Proxy Security Server Classes implement only authentication. A developer does not need to modify overwrite this method if the Proxy Security Server Class only performs authentication with no other actions. If the Proxy Security Server Class may change authentication profile and authorizations on a remote security server, then the Proxy Security Server communicates the methods that it can handle. The methods that may be handled are specified as return values set to a combination of codes shown below. To specify more than one code, append the codes together delimited by a '|'.

F_CHAUTHTOK—This code is returned if the Proxy Security Server allows passwords to be changed on a remote security server. That means that Authentication and Authorization Module 114 is free to call pam_chauthtok and this method should already be overwritten. Please refer to the pam_chauthtok method.

F_GETPRIVILEGES—This code is returned if the Proxy Security Server allows authorization to be changed on an remote security server. This means that Authentication and Authorization Module 114 is free to call pam_get_privileges and this method should already be overwritten. Please refer to the pam_get_privileges method.

F_GETPRIMARYPRIVILEGES—This code is returned if the Proxy Security Server Classes support primary privileges. What this means is that Information Access System 100 identifies primary privileges to be like a user type within the Information Access System 100. The pam_get_primary_privileges method should be implemented because Authentication and Authorization Module 114 can call it after authentication.

F_SETPROFILES—This code is returned if the Proxy Security Server supports property setting to the external system. This means that attributes can be changed in the source system and this method is in charge of setting those attributes. Also, this method is in charge of displaying the current values or options to the users so that they are aware of the changes.

public int pam_chauthtok(String pamh) throws PAMHandleException

This method is called by Authentication and Authorization Module 114 when Proxy Security Servers 130 allows changing passwords on the system. The pam_chauthtok implements, for example, challenging the user and changing the user's password in a Remote Security Server 140.

public String[ ]pam_get_privileges(String pamh) throws PAMHandleException

This method is called by Authentication and Authorization Module 114 when a Proxy Security Server allows authorizations to be changed on a Remote Security Server 140. The pam_get_privileges is in charge of returning a list of privileges that the user has in the source system. For example, Windows NT users have groups associated with them; so, the Proxy Security Server Class can return the list of groups associated with the user. These privileges are then passed to Authentication and Authorization Module 114, which is responsible for converting the privileges to access roles.

public String[ ]pam_get_primary_privileges(String pamh) throws PAMHandleException This method is called by Authentication and Authorization Module 114 when remote authorization is enabled. The pam_get_primary_privileges returns a list of main privileges that the user has on the Remote Security Server 140. For example, under Windows NT Domain Authentication, users have a primary group associated with them. The Proxy Security Server can return the group associated with the user. These primary privileges are then passed to Authentication and Authorization Module 114 and Authentication and Authorization Module 114 converts the privileges into user types.

public int pam_set_profile (String pamh) throws PAMHandleException

This method is called by Authentication and Authorization Module 114 when user profile information may be changed on a Remote Security Servers 140. The pam_set_profile changes specific property or attribute information in a Remote Security Servers 140 source system. For example, a Proxy Security Server allows a user to change their name, address, and marital status stored in a user profile on a Remote Security Servers 140. This method needs to perform the conversation to the user and ask the specific information from the user himself. This method should return one of the following return codes:

PAM_SUCCESS—This code is returned when the authentication process was successful.

PAM_ACCT_EXPIRED—This code is returned when the user account is inactive.

PAM_USER_UNKNOWN—This code is returned when the user is a unknown user or the userid, password combination is not valid.

PAM_AUTH_ERR—This code is returned when an unexpected error occurs.

PAM_FATAL—This code is returned if there is a fatal error in the external system. Either the dynamic library did not load correctly or can not communicate with the external system with the given configuration.

public String get_pam_unique_user(String pamh) throws PAMHandleException

This method is called by Authentication and Authorization Module 114 after authenticating the user. This is the unique userid for the user for a specific Proxy Security Server Class. The need for this method stems from the Proxy Security Server's ability to handle different users with the same userid that reside in different groupings. For example, Windows NT Domain Authentication differentiates users with the same userid from different domains by pre-pending the domain name followed by a back slash "\". The default behavior for this method is to return the userid that was entered by the user. Therefore, this method does not need to be changed if there is no differentiation between users in different groupings.

public void pam_finish_auth(String pamh, String gaUserLogin) throws PAMHandleException This method allows a Proxy Security Server to perform additional tasks after a user a authenticated. For example, the Proxy Security Server may save some information in a database or flat file. The string gaUserLogin is data identifying the user in issue. The default behavior is to do nothing. This method is only called after user login was successful and the user was authenticated.

public String[ ]get_associated_pam(String pamh, String gaUserLogin) throws PAMHandleException This method is called after a successful self-registration and the Proxy Security Server decides to make the user login to another Proxy Security Server that is not the one that the current Proxy Security Server supports. For instance, a self-registration for userid/password can request Authentication and Authorization Module 114 to associate the user with LDAP [what is ldap?] because the Proxy Security Server might have created the LDAP account. Authentication and Authorization Module 114 calls pam_finish_auth right after the account is created, but before the association of the authentication method.

abstract public String pam_version( )

This method needs to be implemented by a Proxy Security Server Subclass to return its version.

abstract public String pam_author( )

This method needs to be implemented by a Proxy Security Server Subclass to return the Proxy Security Server Subclass author.

public anyPAAM( ) & public anyPAAM(String name, String authSourceName)

There are two constructors for any Proxy Security Server Subclass that are used to initialize the base class. These constructor can also initialize private member variables after calling the base class.

public boolean setConfiguration(String array[ ])

This method is called by Authentication and Authorization Module 114 to set the configuration for a Proxy Security Server Class. Extra functionality can be added to this method after calling the base class.

APPENDIX II

Methods Used to Access Services Provided by Authentication and Authorization Module protected String pam_get_configuration(String key)

This method is used to get the data about the configuration of a Proxy Security Server. You can get any configuration parameter by just giving the name of the configuration parameter. The parameters values are specified by the parameter 'config' in Proxy Configuration Data 113.

protected String pam_getenv(String pamh, String name) throws PAMHandleException

This method is used to get any environment variables from the Authentication and Authorization Module 114. Valid parameter names may be are:

REMOTE_ADDR—The IP address from where the user is accessing the information access system.

SERVER_NAME—The name of the server hosting the Web Server communicating with the users browser. [Note to inventor: Please explain what this parameter is].

SERVER_PORT—The port number where the Web Server is listening to HTTP requests.

HTTP_USER_AGENT—The name of the user's browser (Netscape, MSIE, etc.).

HTTP_REFERER—The referrer page. The page that sent the user to the current script.

REMOTE_USER—The userid of the user trying being authenticated.

protected Hashtable pam_getenvlist(String pamh) throws PAMHandleException

This method is used to get the list of all the environment variables that are sent by the Information Access System 100. This can be used to find out what variables are currently be sent by the Information Access System 100.

public String pam_get_item(String pamh, int itemType) throws PAMHandleException, PAMSymbolException This method is used to get a specific item of information related to a session. The possible values for itemType, and the corresponding information that is returned when the itemType is set, are shown below.

PAMDataShare.PAM_USER—The userid.

PAMDataShare.PAM_AUTHTOK—The user's password.

PAMDataShare.PAM_OLDAUTHTOK—The user's old password.

PAMDataShare.PAM_AUTH_PURPOSE—The login purpose. This item type is used when the Proxy Security Server Class is configured to perform different types authentication. The purposes can be:
1. AUTH_PURPOSE—Authentication purpose.
2. SELFREG_PURPOSE—Self-registration purpose.
3. OTHERSELFREG_PURPOSE—Adding authentication method purpose.

protected String pam_get_user(String pamh) throws PAMHandleException

This method is used to get the userid of the user. This function is exactly the same as calling pam_get_item with the PAM_USER as the item type.

protected String[ ]pam_conv(String pamh, int msgType[ ], String msg[ ])

This method is used by a Proxy Security Server to communicate back to the user. This is the only way in which a Proxy Security Server can ask specific questions to the user. This method requires the message type and the actual message. The message types allowed are:

PAM_PROMPT_ECHO_OFF—The message type causes the user input not to be displayed. That means the user will not see what he/she is typing. The text that is placed as the label will be translated with the message itself.

PAM_PROMPT_ECHO_ON—The message type is a normal input text. The label will be translated with the message of the same array index.

PAM_PROMPT_RW—This message type will display a translated label with a non-translated field that is read and write. This means that the user will see the current value for the label and change it.

PAM_PROMPT_R—This message type will display a translated label with a non-translated field that is read only. This means that the user will only see the current value for the label.

PAM_ERROR_MSG—This is an error message that will be displayed in the browser the user is using. The error message is a label that will be translated.

PAM_TEXT_INFO—This is a textual information that will be displayed to the user. The message is actually a label that will be translated.

PAM_NOXLATE_TEXT—This message type is the same as PAM_TEXT_INFO, but the message is not translated.

PAM_CHOICE—The message type is used to generate selections that may be selected by the user. Both the label and the choices will be translated. The delimiter between the label and the choice is a colon (":").

PAM_NOXLATE_CHOICE—This message type is the same as PAM_CHOICE with the only difference that the choices will not be translated.

protected void set_item_object(String pamh, Object obj) throws PAMHandleException This method is used to set an object that will be later used by the Proxy Security Server Classes. This is very useful for storing information when doing self-registration because some methods are called at the end of the self-registration process to perform any action needed by the Proxy Security Server. The best way to use this method is to store a hashtable with information and then retrieve them. A sample usage is to store information that is used in the authentication method and then retrieve them in the pam_finish_auth method. The pam_finish_auth is called after a user self registers.

protected Object get_item_object(String pamh) throws PAMHandleException

This method is used to get an object that set from a previous called method. This method can be used in the pam_finish_auth to retrieve the information that was set previously.

What is claimed is:

1. A method of selectively authenticating and authorizing a client seeking access to one or more networked computer systems that are protected by an access control system, the method comprising the computer-implemented steps of:
   receiving a request of a client to access one of the computer systems;
   requesting a proxy security server to authenticate the client using information identifying the client;
   receiving an authorization of the client from the proxy security server based on authentication results received from a remote security server that is coupled to the proxy security server;
   establishing access rights of the client, based on one or more access information records received from the remote security server through the proxy security server, for use by the access control system in determining whether to grant the client access to the computer systems.

2. A method as recited in claim 1, wherein requesting a proxy security server to authenticate the client using information identifying the client comprises requesting a proxy security server, selected from among a plurality of proxy security servers each of which is coupled to and associated with a different remote security server, to authenticate the client using information identifying the client.

3. A method as recited in claim 2, wherein receiving an authorization of the client comprises receiving an authorization of the client from the selected proxy security server based on authentication results received from the remote security server that is coupled to and associated with the selected proxy security server.

4. A method as recited in claim 1, wherein requesting a proxy security server to authenticate the client comprises invoking an authentication method having an implementation that is specific to the remote security server.

5. A method as recited in claim 1, further comprising modifying one or more authorizations that are stored on the remote security server based on a session identifier associated with the client.

6. A method as recited in claim 1, further comprising modifying a user profile that is associated with the client and stored on the remote security server.

7. A method as recited in claim 1, further comprising receiving information defining services that the proxy security server is capable of providing.

8. A method as recited in claim 1, further comprising self registering the client in a database of an access control system that controls access to the protected computer systems when user identification information received from the client is authenticated by the proxy security server.

9. A method as recited in claim 2, wherein establishing access rights of the client further comprises receiving one or more authorizations from remote security server through the proxy security server, and converting the authorizations into access roles that are associated with the client based on a mapping that is stored in within a set of configuration information, wherein the configuration information comprises a plurality of blocks of configuration data, wherein each block of configuration data is associated with one of the proxy security servers.

10. A method as recited in claim 9, further comprising persistently storing the converted access roles in a database of an access control system that controls access to the protected computer systems.

11. A method of providing a security mechanism for one or more computer systems, the method comprising the steps:
a first server receiving a message specifying a request to register a user that is unregistered on the first server;
wherein the first server is configured to receive requests to authenticate users and supply information that indicates access rights of users;
the first server causing a transmission to a second server requesting data that indicates access rights specified by the second server for the user;
wherein the second server is configured to receive requests to authenticate users and supply information that indicates access rights of users;
the first server receiving data, transmitted by the second server in response to receiving the transmission, that indicates access rights specified by the second server for the user including at least one authorization;
storing data that indicates the at least one authorization;
persistently storing data in one or more access information records that indicates:
the user is registered on the first server, and
whether access rights for the user should be obtained from the second server; the first server subsequently receiving a request to login the user; and
in response to receiving the request to login the user, establishing access rights based on the one or more access information records.

12. The method of claim 11, further including the step of:
persistently storing data in the one or more access information records that indicates that access rights of the user should be obtained from the second server;
wherein the step of establishing access rights based on the one or more access information records includes:
examining at least a portion of the one or more access information records to determine that information about access rights of the user should be obtained from the second server; and
in response to determining that information indicating that access rights of the user should be obtained from the second server, the first server causing the second server to supply the at least one authorization.

13. The method of claim 11,
wherein the step of storing data that indicates the at least one authorization includes persistently storing data in the one or more access information records that indicates the at least one authorization;
wherein the step establishing access rights based on the one or more access information records includes generating, from the one or more access information records that indicates the at least one authorization, data that establishes the authorization as an access right.

14. The method of claim 11, wherein the step of the first server causing a transmission includes transmitting to a third server that is dedicated to providing the first server data specifying the access rights specified by the second server for a set of users.

15. The method of claim 12, further including the step of transmitting a message to one or more other servers that specifies a request for access rights specified by each of the one or more other servers for a set of users, and
wherein the third server and the one or more other servers communicates with the first server through a API.

16. A method of providing a security mechanism for one or more computer systems, the method comprising the steps:
a first server receiving a message specifying a request to determine access rights of a user registered on the first server;
wherein the first server is configured to receive requests to authenticate users and supply information that indicates access rights of the users;
the first server causing a transmission to a second server that requests data that indicates the access rights specified by the second server for the user;
wherein the second server is configured to receive requests to authenticate users and supply information that indicates access rights of users;
the first server receiving data, transmitted by the second server in response to receiving the transmission, that indicates a first set of authorizations specified by the second server for the user;
the first server translating data that indicates the first set of access rights specified by the second server to one or more records that indicates a second set of access rights recognized by the first server; and
establishing a third set of access rights based on the one or more records.

17. The method of claim 16, further including the steps of:
persistently storing data representing the second set of authorizations;
after persistently storing, the first security server subsequently receiving a request to login the user; and
in response to receiving the request to login the user, establishing access rights that include the second set of authorizations based on the persistently stored data.

18. The method of claim 17, wherein the step of the first server translating data includes generating data representing access roles that correspond to the first set of authorizations.

19. A method of providing a security mechanism for one or more computer systems, the method comprising the steps:
causing start up of a plurality of proxy servers that provide to a first server data that indicates access rights specified for users by a respective server from a second set of servers that are each configured to receive requests to authenticate users and supply information that indicates access rights of users;
the first server transmitting, to each proxy server of the plurality of proxy servers, a request for data indicating the access rights specified by the respective server from the second set of servers for a particular user by invoking a function of an application programmer interface that includes a common set of functions that:
is associated with the plurality of proxy servers, and provides an interface between the first server and the second set of servers; and
in response to each proxy server of the plurality of proxy servers receiving the request for data indicating access rights of the particular user:
the each proxy server obtaining information about access rights of the particular user from a server of the set of servers, and the each proxy server supplying information about access rights of the particular user to the first server.

20. The method of claim 19, wherein the step of the first server causing the start up includes instantiating each proxy server as an instantiation of a subclass of a parent class that defines application program interface.

21. The method of claim 19, further including the step of obtaining user input by performing the steps of:

a second server from the set of servers transmitting to a first proxy server from the plurality of proxy servers a user prompt message that specifies how additional user input should be elicited from a user;

the first server receiving the user prompt message; and the first server causing a user interface to obtain user input in a manner specified by the user prompt message.

22. The method of claim 21, wherein the step of obtaining user input includes obtaining user input that specifies a user profile for the user.

23. The method of claim 21, wherein the step of obtaining user input includes obtaining user input that specifies authentication input for the user.

24. The method of claim 19, further including the steps of:

the first server receiving data from the first proxy server from the plurality of proxy servers that is supplying information about access rights of the particular user including data indicating that the particular user is registered on the respective server from the second set of servers; and in response to the first server receiving the data from a first proxy server, the first server registering the particular user.

25. The method of claim 24, wherein the method further includes the steps of presenting a user with a selection of names that each correspond to a proxy server from the plurality of proxy servers;

selecting a name corresponding to the first proxy server;

transmitting a request to the proxy server to authenticate the particular user; and wherein the data from a first proxy server was transmitted by the first proxy server in response to the request to authenticate.

26. An access security system, comprising a first server configured to receive requests to authenticate users and supply information that indicates access rights of users;

a set of one or more servers that are each configured to receive requests to authenticate users and supply information that indicates access rights for users;

a plurality of proxy servers configured to provide to the first server data that indicates the access rights specified for users by a respective server from the set of one or more servers;

the plurality of proxy servers each configured as instantiations of a subclass belonging to a base class that defines an application program interface through which the plurality of proxy servers and the first server interact to provide the first server with information that indicates access rights for users;

a topology mechanism configured to transmit to the first server information specifying which proxy server of the plurality of proxy servers are running; and an access server configured to collect authentication input from a user attempting to log into the access security system and to transmit data representing the collected authentication input to the first server.

27. A computer-readable medium carrying one or more sequences of instructions which, when executed by one or more processors, cause the one or more processors to selectively authenticate and authorize a client seeking access to one or more protected computer systems over a network, by:

receiving a request of a client to access one of the computer systems;

requesting a proxy security server to authenticate the client using information identifying the client;

receiving an authorization of the client from the proxy security server based on authentication results received from a remote security server that is coupled to the proxy security server;

establishing access rights of the client based on one or more access information records received from the remote security server through the proxy security server.

28. An apparatus for selectively authenticating and authorizing a client seeking access to one or more protected computer systems over a network, comprising:

a processor; and a memory having one or more sequences of instructions stored therein which, when executed by the processor, cause the processor to carry out the computer-implemented steps of:

receiving a request of a client to access one of the computer systems;

requesting a proxy security server to authenticate the client using information identifying the client;

receiving an authorization of the client from the proxy security server based on authentication results received from a remote security server that is coupled to the proxy security server;

establishing access rights of the client based on one or more access information records received from the remote security server through the proxy security server.

29. A method as recited in claim 9, further comprising persistently storing the converted access roles in a database of an access control system that controls access to the protected computer systems, whereby authorizations managed by the remote security server are dynamically migrated to the access control system.

* * * * *